(12) United States Patent
Lin et al.

(10) Patent No.: US 10,581,359 B1
(45) Date of Patent: Mar. 3, 2020

(54) OUTPUT TORQUE CALCULATION DEVICE AND CALCULATION METHOD THEREOF

(71) Applicant: INDUSTRIAL TECHNOLOGY RESEARCH INSTITUTE, Hsinchu (TW)

(72) Inventors: Chun-An Lin, Taoyuan (TW); Hsi-Chih Chang, Hsinchu (TW); Hsin-Hung Chou, Changhua County (TW); Wen-Che Shen, New Taipei (TW); Kuan-Jung Lin, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/233,357

(22) Filed: Dec. 27, 2018

(30) Foreign Application Priority Data

Nov. 28, 2018 (TW) .............................. 107142390 A

(51) Int. Cl.
*H02P 21/20* (2016.01)
*H02P 6/16* (2016.01)

(52) U.S. Cl.
CPC ................ *H02P 21/20* (2016.02); *H02P 6/16* (2013.01)

(58) Field of Classification Search
CPC ........ G01L 3/1407; F16F 1/027; G01B 11/16; H02P 6/00; H02P 6/002; H02P 6/003;
(Continued)

(56) References Cited

U.S. PATENT DOCUMENTS

| 7,677,114 B2 | 3/2010 | Deshmukh et al. |
| 9,061,420 B2 | 6/2015 | Yoo et al. |

(Continued)

FOREIGN PATENT DOCUMENTS

| CN | 101677866 B | 2/2012 |
| CN | 102713217 B | 7/2015 |

(Continued)

OTHER PUBLICATIONS

Nenad M. Kircanski, An Experimental Study of Nonlinear Stiffness, Hysteresis, and Friction Effects in Robot Joints with Harmonic Drives and Torque sensors, Apr. 1997, The International Journal of Robotics Research, vol. 16, No. 2, pp. 214-239 (Year: 1997).*

(Continued)

*Primary Examiner* — Antony M Paul
(74) *Attorney, Agent, or Firm* — Locke Lord LLP; Tim Tingkang Xia, Esq.

(57) ABSTRACT

An output torque calculation device and a method thereof is provided, and the output torque calculation device includes a first sensor, a second sensor, a rotor, a reducer, a processor, and an elastic device. An input portion of the reducer and an output portion of the reducer are respectively connected to the rotor and an input portion of the elastic device, and an output portion of the elastic device is configured to connect to a load. The output torque calculation method comprises: detecting a first angle of the rotor by the first sensor; detecting a second angle of the output portion of the elastic device by the second sensor; and calculating a torque carried by a final output end of the output torque calculation device by the processor according to the first angle and the second angle.

13 Claims, 4 Drawing Sheets

(58) Field of Classification Search
CPC .......... H02P 6/005; H02P 6/006; H02P 6/007;
H02P 6/008; H02P 6/04; H02P 6/06;
H02P 6/08; H02P 6/10; H02P 6/12; H02P
6/16; H02P 6/165; H02P 6/22; H02P
7/00; H02P 7/0038; H02P 7/0094; H02P
7/06; H02P 7/063; H02P 7/066; H02P
7/305; H02P 8/00; H02P 8/08; H02P
8/20; H02P 21/00; H02P 21/146; H02P
21/148; H02P 23/00; H02P 23/004; H02P
23/005; H02P 27/00; H02P 27/04; H02P
27/06; H02P 1/00; H02P 1/04; H02P
1/22; H02P 1/24; H02P 1/26; H02P 1/46;
H02P 1/465; H02P 3/00; H02P 3/025;
H02P 4/00; H02P 5/00; H02P 5/695
USPC .......... 318/400.01, 700, 701, 721, 799, 800,
318/801, 400.14, 430, 432; 901/8, 14,
901/15, 19, 23, 24, 25, 27, 30; 173/181;
73/1.09, 54.39, 64.49, 862.23, 862.08
See application file for complete search history.

(56) References Cited

U.S. PATENT DOCUMENTS

| | | | |
|---|---|---|---|
| 9,205,556 B1 | 12/2015 | Magnusson et al. | |
| 9,293,962 B2 | 3/2016 | Park et al. | |
| 9,321,172 B2* | 4/2016 | Johnson | B25J 9/08 |
| 9,534,931 B2 | 1/2017 | Ueda et al. | |
| 9,772,240 B2* | 9/2017 | Hulse | F16F 1/027 |
| 2014/0224057 A1 | 8/2014 | Tanaka et al. | |
| 2017/0136629 A1* | 5/2017 | Nagata | B25J 13/085 |
| 2017/0212007 A1 | 7/2017 | Li | |

FOREIGN PATENT DOCUMENTS

| | | |
|---|---|---|
| CN | 104948674 A | 9/2015 |
| CN | 105518223 A | 4/2016 |
| CN | 104245242 B | 7/2016 |
| CN | 106041924 A | 10/2016 |
| CN | 106644456 A | 5/2017 |
| CN | 108733001 A | 11/2018 |
| KR | 101515455 B1 | 5/2015 |
| TW | I514100 B | 12/2015 |
| WO | 2016151360 A1 | 9/2016 |
| WO | 2016171799 A1 | 10/2016 |

OTHER PUBLICATIONS

Tomohiro Kawakami et al., High-fidelity joint drive system by torque feedback control using precision linear encoder, IEEE International Conference on Robotics and Automation, 2010.

Xing Liu et al., A torque measuring method based on encoder for permanent magnet synchronous machine, 17th International Conference on Electrical Machines and Systems (ICEMS), 2014.

Byung-jin Jung et al., Joint Torque sensor Embedded in Harmonic Drive Using Order Tracking Method for Robotic Application, Journal of Latex Class Files, 2015, vol. 14, No. 8.

Hiroshi Kaminaga et al., Measurement Crosstalk Elimination of Torque Encoder Using Selectively Compliant Suspension, IEEE International Conference on Robotics and Automation, 2011.

Navvab Kashiri et al., On the Sensor Design of Torque Controlled Actuators: A Comparison Study of Strain Gauge and Encoder-Based Principles, IEEE Robotics and Automation Letters, 2017, vol. 2 , No. 2.

Radoslav Cipin et al., Measurement and evaluation of DC motor starting torque, IEEE, 2017.

Taiwan Patent Office, "Notice of Allowance", dated Apr. 30, 2019, Taiwan.

* cited by examiner

OUTPUT TORQUE CALCULATION DEVICE AND CALCULATION METHOD THEREOF

CROSS-REFERENCE TO RELATED APPLICATIONS

This non-provisional application claims priority under 35 U.S.C. § 119(a) on Patent Application No(s). 107142390 filed in the Republic of China on Nov. 28, 2018, the entire contents of which are hereby incorporated by reference.

BACKGROUND

1. Technical Field

This disclosure relates to a calculation device of an output torque and a method thereof.

2. Related Art

With the development of industrial automation, the types of products that need to be processed at the factory become more diverse, so services that the factory needs to provide are increasingly complex. In order to cope with these complex tasks, in addition to requiring high-precision positioning control of the robot arm in the factory, it is necessary to improve the safety mechanism of the factory.

In order to achieve an accurate positioning of the robot arm, the drive system of the robot arm usually has an encoder, and the information of the encoder is used to correct the positioning error caused by the deformation of the robot arm. On the other hand, the drive system is further equipped with a torque sensor. The data of the torque sensor prevents the robot arm from damage or collision due to an excessive torque of the drive system so as to reduce accidental risks. However, the addition of the torque sensor increases the size of the drive system, increases production costs, and complicates the wire arrangement of the driving system.

Therefore, there is indeed a need for an improved output torque measurement system and a method thereof, which can at least improve the above disadvantages.

SUMMARY

According to one or more embodiment of this disclosure, an output torque calculation device is provided, and the output torque calculation device comprises a motor, a first sensor, a transmission device, an elastic device, a second sensor and a processor. The motor has a rotor. The first sensor is connected to the rotor and measures a first angle of the rotor. The transmission device includes a first input portion and a first output portion, and the first input portion is connected to the rotor. The elastic device comprises a second input portion, a second output portion and a rotation axis, the second input portion is connected to the first output portion, and the second output portion is configured to connect to a load. There is a first distance between the second input portion and the rotation axis, there is a second distance between the second output portion and the rotation axis, and the first distance is different from the second distance. The second sensor is connected to the second output portion and measures a second angle of the second output portion. The processor is electrically connected to the first sensor and the second sensor and calculates an output torque carried by a final output end of the output torque calculation device according to the first angle and the second angle.

According to one or more embodiment of this disclosure, an output torque calculation method is provided, the output torque calculation method is performed by a calculation device. The calculation device comprises a first sensor, a second sensor, a rotor, a reducer, a processor and an elastic device. A first input portion of the reducer and a first output portion of the reducer are connected to the rotor and a second input portion of the elastic device respectively. A second output portion of the elastic device is configured to connect to a load, the output torque calculation method comprising: detecting a first angle of the rotor by the first sensor; detecting a second angle of the second output portion of the elastic device by the second sensor; and calculating an output torque carried by a final output end of the calculation device according to the first angle and the second angle by the processor.

BRIEF DESCRIPTION OF THE DRAWINGS

The disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
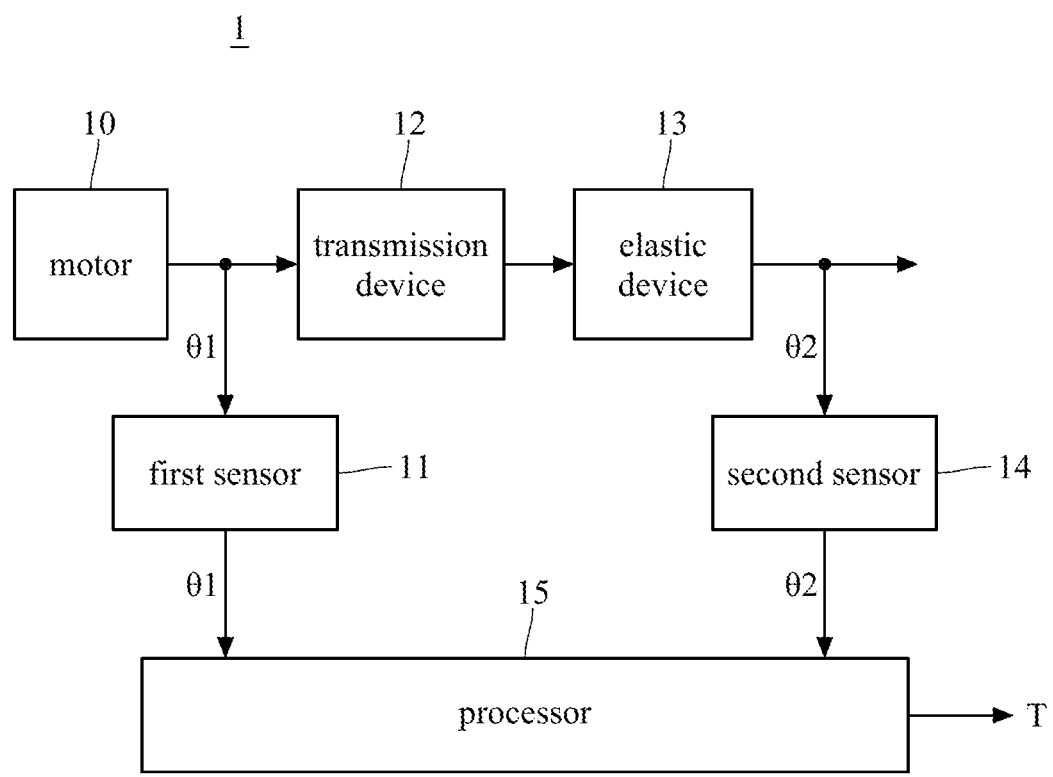
FIG. 1 is a functional block diagram of an output torque calculation device according to an embodiment of the disclosure.
Figure 2:
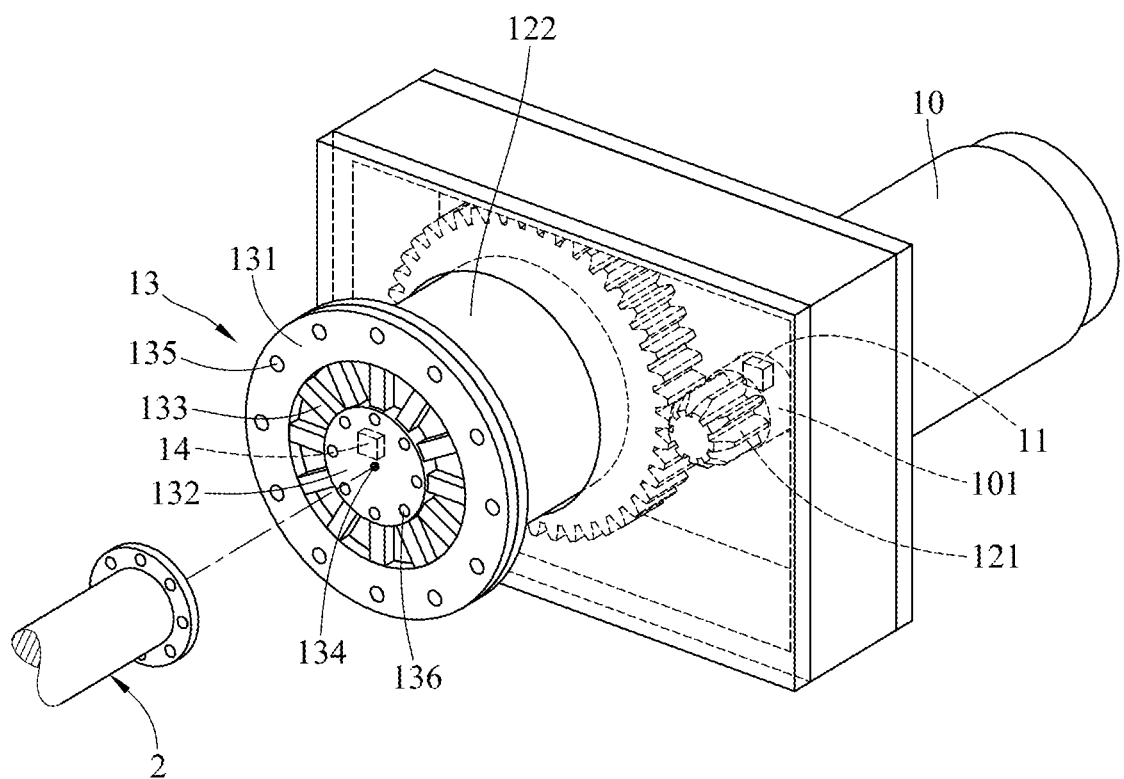
FIG. 2 is a perspective view of an output torque calculation device according to an embodiment of the disclosure.

Please refer to FIG. 1 which is a functional block diagram of an output torque calculation device according to an embodiment of the disclosure, and FIG. 2 is a perspective view of an output torque calculation device according to an embodiment of the disclosure. Refer to FIG. 1 and FIG. 2, an output torque calculation device 1 is a motor driving system in this embodiment. The output torque calculation device 1 may comprise a motor 10, a first sensor 11, a transmission device 12, an elastic device 13, a second sensor 14, and a processor 15. The type of the motor 10 is not limited, such as a DC single-phase motor, a DC three-phases motor, an AC motor single-phase motor, or an AC three-phases motor. In this embodiment, the motor 10 is a direct current single phase motor. The motor 10 includes a stator (not shown) and a rotor 101, and the first sensor 11 is assembled with the rotor 101 of the motor 10. When the rotor 101 of the motor 10 starts rotating, the first sensor 11 measures a first angle of the rotor 101.

As shown in FIG. 1 and FIG. 2, the type of the transmission device 12 is not limited, such as a warm wheel reducer, a warm screw reducer, a gear reducer or a harmonic reducer. In this embodiment, the transmission device 12 is a gear reducer. The transmission device 12 has a first input portion 121 and a first output portion 122. The first input portion 121 is connected to the rotor 101. Since the first output portion 121 is located at a small gear having a smaller radius and the first output portion 122 is located at a big gear having a larger radius, the speed of the rotor 101 can be reduced and the output torque of the motor 10 can be increased by the gear reducer. In other embodiments, the first sensor 11 may be connected to the first input unit 121.

Figure 3:
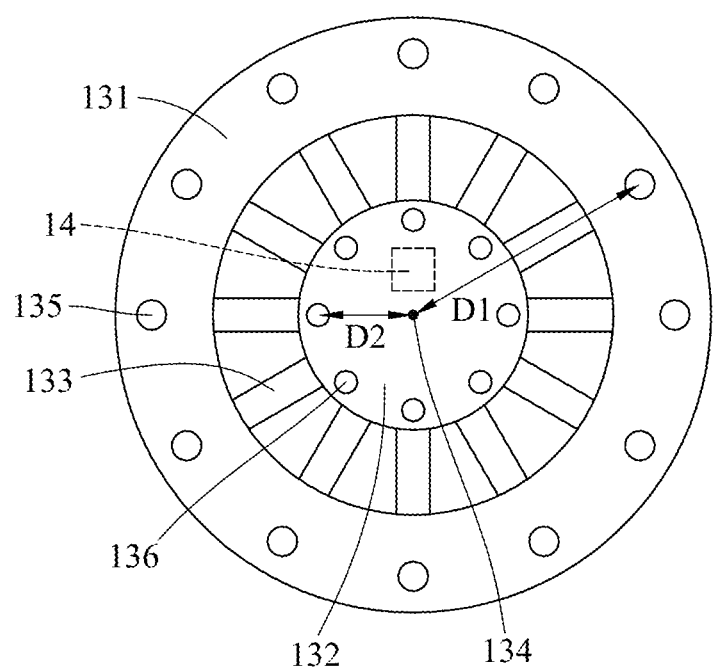
FIG. 3 is a perspective view of an elastic device according to an embodiment of the disclosure.

FIG. 3 is a perspective view of an elastic device according to an embodiment of the disclosure. As shown in FIG. 3, the elastic device 13 may be a one-piece structure and made by elastic metal, the type of the elastic device 13 and the shape of the elastic device 13 are not limited as long as the elastic device 13 is only deformed and is not broken when it is suffered from shear stresses. In another embodiment, the elastic device 13 may be made by alloy, plastic, rubber, composite material and so on. For example, the elastic device 13 may be a torsion spring. In this embodiment, the elastic device is an integrally formed flange, and a shape of the flange is similar as a shape of a wheel, and the elastic device 13 includes a second input portion 131, a second output portion 132, a plurality of connecting elements 133, and a rotation axis 134.

The second input portion 131 of the elastic device 13 is an annular structure with a constant width, the second output portion 132 is a circular structure, and the second input portion 131 surrounds the second output portion 132. The connecting elements 133 are columnar structures and are spaced apart from each other and each of the connecting elements links the second input portion 131 and the second output portion 133, and intervals of the connecting elements 133 are the same. In other embodiments, the shape of the connecting element 133 is not limited and may have other shapes, such as a curved shape or a spiral shape, and the intervals of the connecting elements 133 may be unequal.

The second input portion 131 is provided with a plurality of first fixing elements 135. The first fixing elements 135 may be, for example, screw holes, and the first fixing elements 135 surround the rotation axis 134 and are respectively equidistant from the rotation axis 134. The second output portion 132 is provided with a plurality of second fixing elements 136, and the second fixing elements 136 may be, for example, screw holes, and the second fixing elements 136 surround the rotation axis 134 and are respectively equidistant from the rotation axis 134. There is a first distance D1 between the first fixing element 135 of the second input portion 131 and the rotation axis 134, and there is a second distance D2 between the second fixing element 136 of the second output portion 133 and the rotation axis 134, and the first distance D1 is different from the second distance D2. The first fixing elements 135 of the elastic device 13 respectively lock with the transmission device 12 by a plurality of locking members, and the second fixing elements 136 of the elastic device 13 respectively lock with a load 2 by a plurality of locking members, wherein the locking members may be, for example, screws. Therefore, an angular displacement of the gear reducer can be amplified by the elastic device 13.

As shown in FIG. 1 and FIG. 2, the second sensor 14 is assembled with the second output portion 132 of the elastic device 13. When the rotor 101 of the motor 10 starts rotating, the second sensor 14 measures a second angle of the second output portion 132. The processor 15 is electrically connected to the first sensor 11 and the second sensor 14. In one embodiment, the processor 15 is connected to the first sensor 11 and the second sensor 14 by conductive wires so as to transmit the first angle and the second angle to the processor 15. In another embodiment, the first sensor 11 and the second sensor 14 transmit the first angle and the second angle to the processor 15 by a wireless communication means. In this embodiment, the processor 15 stores an output torque calculation algorithm, a reduction ratio of the reducer, a backlash of the reducer, a first shear modulus of the reducer, and a second shear modulus of the elastic device 13. The processor 15 calculates an output torque which is carried by a final output end of the output torque calculation device 1 based on the first angular, the second angular, a current rotational direction of the rotor 101, the reduction ratio of the reducer, the backlash of the reducer, the first shear modulus of the reducer and the second shear modulus of the elastic device 13. The output torque which is carried by the final output end comprises a first torque only generated by the motor driving system and a second torque generated by an external force applied to the motor driving system. In this embodiment, the final output end of the motor driving system is the second output portion 132 of the elastic device 13. In other embodiments, the processor 15 may further be electrically connected to a server or a mobile communication device to transmit the output torque carried by the final output end of the motor driving system, and then the server or the mobile communication may store or display the output torque.

Figure 4:
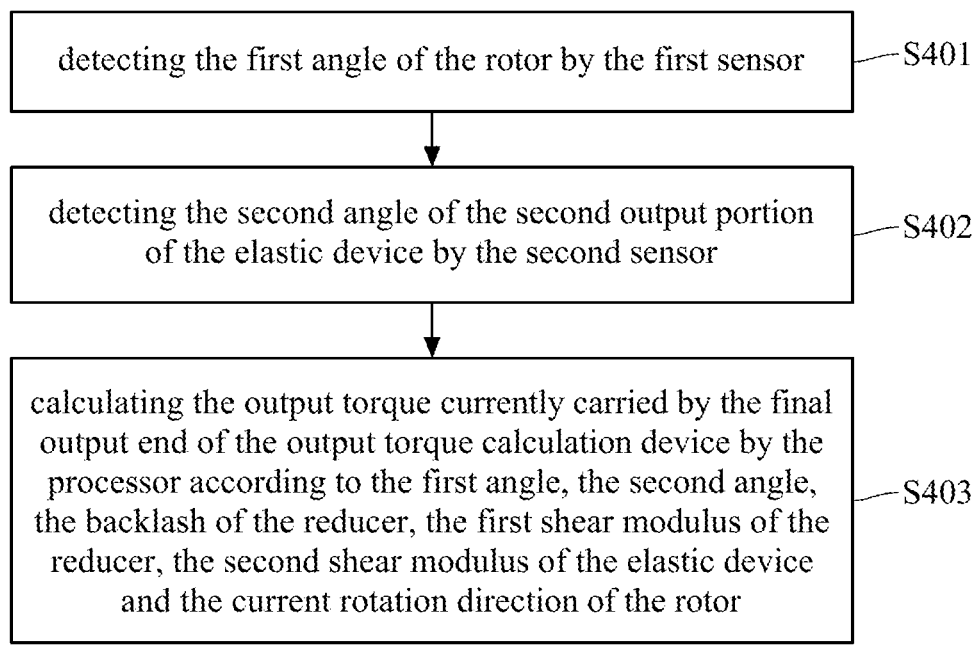
FIG. 4 is a flowchart of an output torque calculation method according to an embodiment of the disclosure.

FIG. 4 is a flowchart of an output torque calculation method according to an embodiment of the disclosure. Refer to FIG. 1, FIG. 2 and FIG. 4, step S401 is detecting the first angle of the rotor 101 by the first sensor 11 when the motor 10 starts rotating. In this embodiment, the transmission device 12 is a reducer and step S402 is detecting the second angle of the second output portion 132 of the elastic device 13 by the second sensor 14 when an output torque of the motor 10 is increased by the reducer to drive the rotation of the elastic device 13. In step S403, the backlash of the reducer, the first shear modulus of the reducer, the second shear modulus of the elastic device 13 and the output torque calculation algorithm have been stored into the processor 13 and step S403 is calculating the output torque currently carried by the final output end of the output torque calculation device 1 by the processor 15 according to the first angle, the second angle, the backlash of the reducer, the first shear modulus of the reducer, the second shear modulus of the elastic device 13 and the current rotation direction of the rotor 101 after the first sensor 11 and the second sensor 13 respectively transmit the first angle and the second angle to the processor 15.

With respect to a formula 1 for the output torque carried by the final output end of the output torque calculation device 1, $$T = \frac{[(\theta_2 - \theta_1 * G_r) - \theta_{backlash} * Dir] * G2 * G1}{G2 + G1}$$

(formula 1), wherein T represents the output torque carried by the final output end, $\theta_1$ represents the first angle of the rotor 101, $\theta_2$ represents the second angle of the elastic device 13, $\theta_{backlash}$ represents the backlash of the reducer, Dir represents the current rotation direction of the rotor 101, $G_r$ represents the reduction ratio of the reducer, G1 represents the first shear modulus of the reducer, G2 represents the second shear modulus of the elastic device 13.

Even if the output torque calculation device 1 is not equipped with an additional torque sensor, the output torque carried by the final output end of the output torque calculation device 1 can be accurately estimated by the processor 15 according to the formula 1, $\theta_1$, $\theta_2$, $\theta_{backlash}$, Dir, $G_r$, G1 and G2, wherein the output torque carried by the final output end is an output torque applied to the load 2 and generated from the second output portion 132 of the elastic device 13.

Figure 5:
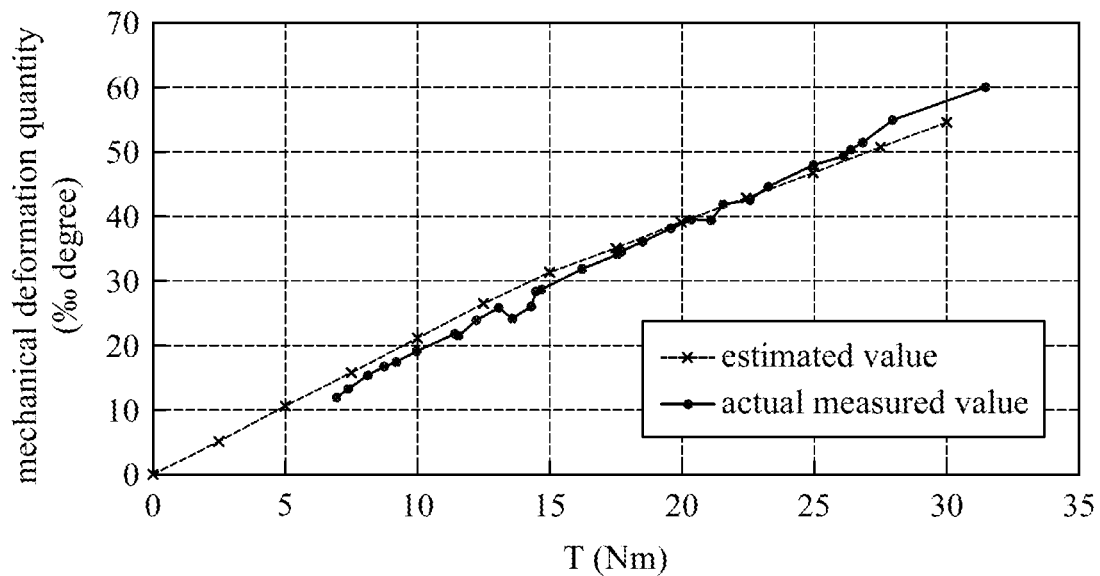
FIG. 5 is a diagram showing a relationship between an output torque of a reducer and a mechanical deformation quantity of the reducer according to an embodiment of the disclosure.

FIG. 5 is a diagram showing a relationship between an output torque of a reducer and a mechanical deformation quantity of the reducer according to an embodiment of the disclosure. $\tau = \Delta\theta * G1$ (formula 2), wherein $\tau$ represents an output torque of a reducer, $\Delta\theta$ represents a shear strain of the reducer, and G1 represents the first shear modulus of the reducer.

$\Delta\theta$ is a mechanical deformation quantity of the reducer, the processor 15 can estimate $\tau$ based on the formula 2, G1, and $\Delta\theta$. As shown in FIG. 5, the larger the output torque of the reducer is, the larger the mechanical deformation quantity of the reducer is. The output torque of the reducer estimated by the processor 15 is similar as an actual output torque of the reducer measured by a torque sensor.

Figure 6:
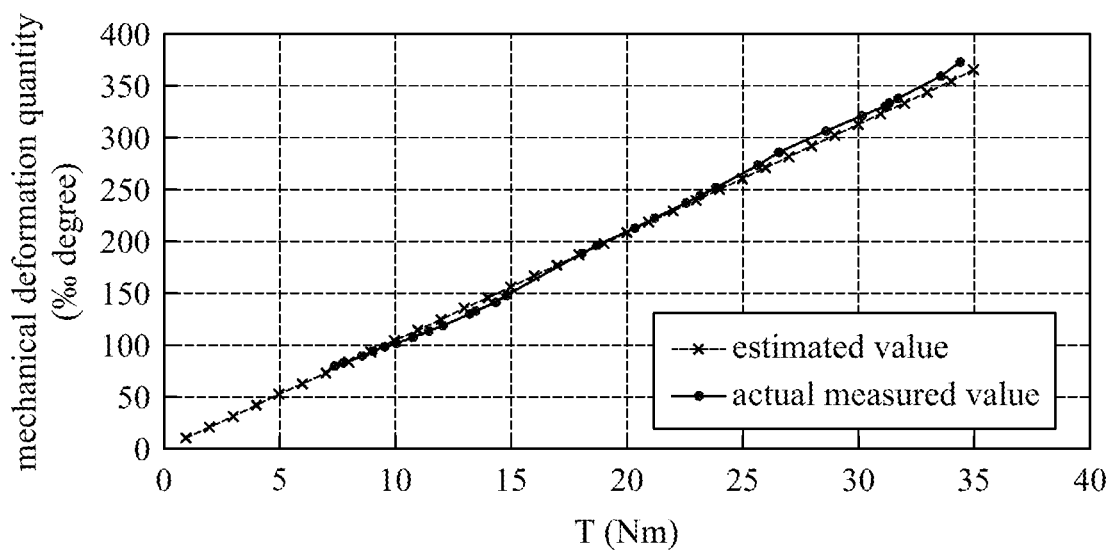
FIG. 6 is a diagram showing a relationship between an output torque of an elastic device and a mechanical deformation quantity of the elastic device according to an embodiment of the disclosure.

FIG. 6 is a diagram showing a relationship between an output torque of an elastic device and a mechanical deformation quantity of the elastic device according to an embodiment of the disclosure. As shown in FIG. 6, the larger the output torque of the elastic device 13 is, the larger the mechanical deformation quantity of the elastic device 13 is. An average error between the output torque of the elastic device 13 estimated by the output torque calculation method of the disclosure and an actual output torque measured by a torque sensor is 0.444 Nm, and the percentage of the average error is 2.429%. Therefore, the error between the output torque estimated by the output torque calculation method of the disclosure and the actual output torque measured by the torque sensor may fall within a tolerable range In view of the above description, a percentage of an error between the output torque estimated by the output torque calculation method of the disclosure and an actual output torque measured by a torque sensor may fall within a tolerable range, so the output torque calculation device does not require to be equipped with an additional torque sensor to measure an actual output torque. On the other hand, an angle of an output portion of the reducer is amplified by the elastic device, so that users can accurately detect angle data by the output torque calculation device without using high-precision angle sensors, and then the output torque calculation device may estimate the output torque carried by the final output end according to the angle data.

What is claimed is:

1. An output torque calculation device, comprising:
   a motor having a rotor;
   a first sensor connected to the rotor and measuring a first angle of the rotor;
   a transmission device comprising a first input portion and a first output portion, with the first input portion connected to the rotor;
   an elastic device comprising a second input portion, a second output portion and a rotation axis, the second input portion connected to the first output portion, the second output portion configured to connect to a load, wherein there is a first distance between the second input portion and the rotation axis, there is a second distance between the second output portion and the rotation axis, and the first distance is different from the second distance;
   a second sensor connected to the second output portion and measuring a second angle of the second output portion; and
   a processor electrically connected to the first sensor and the second sensor, wherein the processor calculates an output torque carried by a final output end of the output torque calculation device according to the first angle and the second angle.

2. The device in claim 1, wherein the elastic device is a one-piece structure.

3. The device in claim 2, wherein the elastic device is an elastic metal device.

4. The device in claim 1, wherein the elastic device further comprises a plurality of connecting elements, the connecting elements are spaced apart from each other and each of the connecting elements links the second input portion and the second output portion, and the second input portion surrounds the second output portion.

5. The device in claim 4, wherein intervals of the connecting elements are the same.

6. The device in claim 4, wherein the second input portion is an annular structure with a constant width, and the second output portion is a circular structure.

7. The device in claim 4, wherein the second input portion is provided with a plurality of first fixing elements, and the first fixing elements surround the rotation axis.

8. The device in claim 7, wherein the first fixing elements are respectively equidistant from the rotation axis.

9. The device in claim 4, wherein the second output portion is provided with a plurality of second fixing elements, and the second fixing elements surround the rotation axis.

10. The device in claim 9, wherein the second fixing elements are respectively equidistant from the rotation axis.

11. An output torque calculation method, performed by a calculation device comprising a first sensor, a second sensor, a rotor, a transmission device, a processor and an elastic device, the transmission device comprising a first input portion and a first output portion, the first input portion and the first output portion connected to the rotor and a second input portion of the elastic device respectively, a second output portion of the elastic device configured to connect to a load, the output torque calculation method comprising:
   detecting a first angle of the rotor by the first sensor;
   detecting a second angle of the second output portion of the elastic device by the second sensor; and
   calculating an output torque carried by a final output end of the calculation device according to the first angle and the second angle by the processor.

12. The method in claim 11, wherein the transmission device is a reducer, and the processor calculates the output torque carried by the final output end based on a backlash of the reducer, a current rotation direction of the rotor, a reduction ratio of the reducer, a first shear modulus of the reducer and a second shear modulus of the elastic device.

13. The method in claim 12, wherein $$T = \frac{[(\theta_2 - \theta_1 * g) - \theta_{backlash} * Dir] * G2 * G1}{G2 + G1}, T$$

represents the output torque, $\theta_1$ represents the first angle, $\theta_2$ represents the second angle, $\theta_{backlash}$ represents the backlash, Dir represents the current rotation direction, g represents the reduction ratio, G1 represents the first shear modulus, and G2 represents the second shear modulus.

\* \* \* \* \*